(12) United States Patent
Bichel et al.

(10) Patent No.: US 7,393,378 B2
(45) Date of Patent: Jul. 1, 2008

(54) METHOD FOR RECOVERING PURIFIED SODIUM BICARBONATE AND AMMONIUM SULFATE

(75) Inventors: Joe Bichel, Calgary (CA); Stephen Schaaf, Calgary (CA)

(73) Assignee: Airborne Industrial Minerals Inc., Calgary (CA)

( * ) Notice: Subject to any disclaimer, the term of this patent is extended or adjusted under 35 U.S.C. 154(b) by 675 days.

(21) Appl. No.: 10/361,687

(22) Filed: Feb. 11, 2003

(65) Prior Publication Data

US 2004/0156775 A1 Aug. 12, 2004

(51) Int. Cl.
*C01D 7/10* (2006.01)

(52) U.S. Cl. .......................... 71/61; 423/423; 423/545

(58) Field of Classification Search .................. 423/423, 423/545; 71/61
See application file for complete search history.

(56) References Cited

U.S. PATENT DOCUMENTS

| | | | | |
|---|---|---|---|---|
| 4,164,543 A | * | 8/1979 | Dezael et al. | 423/189 |
| 5,654,351 A | * | 8/1997 | Kresnyak et al. | 423/423 |
| 5,830,422 A | * | 11/1998 | Kresnyak et al. | 423/243.08 |
| 5,980,848 A | * | 11/1999 | Kresnyak et al. | 423/243.04 |
| 6,106,796 A | * | 8/2000 | Phinney et al. | 423/545 |
| 6,692,716 B1 | * | 2/2004 | Phinney | 423/422 |

OTHER PUBLICATIONS

Jibril et al.; "Chemical conversions of salt concentrates from desalination plants" Feb. 2001, pp. 287-295.
Garret, "Natural Soda Ash Occurrences, Processing, and Use", pp. 421-439 Nov. 1991.
Te-Pang Hou, ph.D, "Manufacture of Soda With Special Reference to the Ammonia Process", Second Ed. 1969, pp. 119-121, 130-131, 143-157, 173, 229-250, 276-279, 342-345, 431-439 and 446-460.
J.W. Mullin, "Crystallization", Fourth Ed., 2001, pp. 104-114, 171-179, 340-343 and 403-420.

* cited by examiner

*Primary Examiner*—Stuart Hendrickson
(74) *Attorney, Agent, or Firm*—Bennett Jones LLP

(57) ABSTRACT

A process for recovering sodium bicarbonate and ammonium sulfate from a sodium sulfate solution. The sodium sulfate solution can be pure or contain other compounds such as sodium sulfite, carbonate, chloride, fluoride, nitrate and nitrite as would be the case if the sodium sulfate solution were derived from a sodium bicarbonate flue gas purification process. Carbon dioxide and ammonia gases or solid ammonium bicarbonate are added to the sodium sulfate solution to precipitate sodium bicarbonate which is removed from solution. The remaining solution is treated in a unique series of precipitation steps in which reactants are first recycled back to the sodium bicarbonate crystallizer and then the amount of sodium in the solution is adjusted to an amount that allows high grade ammonium sulfate fertilizer product to be produced. The process is accomplished using evaporation and precipitation unit operations in a unique sequence that results in 100% conversion of the sodium salt feed stock to sodium bicarbonate and ammonium sulfate in a commercially viable manner.

25 Claims, 11 Drawing Sheets

METHOD FOR RECOVERING PURIFIED SODIUM BICARBONATE AND AMMONIUM SULFATE

CROSS-REFERENCE TO RELATED APPLICATIONS

This is the first application filed for the present invention.

FIELD OF THE INVENTION

The present invention relates to a method for recovering purified sodium bicarbonate and ammonium sulfate from a solution containing primarily sodium sulfate. More particularly, the present invention relates to a method of obtaining sodium bicarbonate and ammonium sulfate from a solution containing primarily sodium sulfate using evaporation and precipitation unit operations in a unique sequence that results in nearly 100% recovery of the feed stock in a commercially viable manner.

BACKGROUND OF THE INVENTION

The preparation of sodium bicarbonate and ammonium sulfate has been discussed at length in the prior art. One of the most recent patents regarding this technology is U.S. Pat. No. 6,106,796, issued to Phinney, Aug. 22, 2000. This patent effectively demonstrates the fact that in all of the prior art, the ability to produce a non contaminated ammonium sulfate product does not exist. This patent is effective for synthesizing high quality ammonium sulfate and sodium bicarbonate by progressive precipitation. This sequencing of precipitations results in "partitioned decontamination" by continuously removing contamination from a predecessor solution which has already been exposed to purification.

Canadian Patent No. 2,032,627, issued Jan. 14, 1997 to Thompson et. al., teaches yet another process for producing sodium carbonate and ammonium sulfate from naturally occurring sodium sulfate. The reference is concerned with the preparation of a double salt of sodium and ammonium sulfate. This is a source of contamination when one is trying to form reasonably pure ammonium sulfate and the presence of any double salt and sodium in an ammonium sulfate product does nothing other than reduce the value of the ammonium sulfate to a non-commercial product. In the methodology, it is clearly stated on page 13, beginning at line 8:

" . . . the brine remaining after screening off the solid sodium bicarbonate contains a mixture of unreacted sodium sulfate, ammonium sulfate, ammonium bicarbonate and minor amounts of sodium bicarbonate. This brine is transferred by a pump 36 into a gas recovery boiler 31 where it is heated to a temperature of 95° to 100° C. Under these conditions, the ammonium bicarbonate breaks down and sodium bicarbonate dissolved in the brine reacts with ammonium sulfate to produce sodium sulfate, carbon dioxide and ammonia. Carbon dioxide and ammonia dissolved in the brine boil off, leaving in the solution a mixture composed mostly of sodium and ammonium sulfate The carbon dioxide and ammonia so regenerated are cooled in a gas cooler 32 and returned to the reactor 21 by a blower 33 after being further cooled in a gas cooler 34. This regeneration step minimizes the amount of carbon dioxide and ammonia used in the process."

It is clear that the brine is evaporated and that the ammonium sulfate is reacted with the brine to produce sodium sulfate inter alia. The phase equilibria relationship between the elements present in the system was not recognized.

The teachings of this reference provide for a closed loop system for a sodium sulfate and ammonium sulfate saturated solution system. This system results in the formation of double salt. The teachings are limited in that it was believed that the solubility difference could yield an ammonium sulfate product. This is incorrect; the result is an ammonium sulfate contaminated system.

In Stiers et al, U.S. Pat. No. 3,493,329, the teachings are directed to the preparation of sodium bicarbonate and hydrochloric acid. This goal is consistent with the teachings of Stiers et al. at column 11 of the disclosure beginning at line 23 through line 43, wherein the following is indicated:

"If, instead of precipitating the double salt in the first stage of the process, it is preferred to precipitate ammonium sulfate, the following procedure may be adopted.

Referring now to FIG. 10, it will be seen that each of the three curves which divide this figure into three parts corresponds to the simultaneous precipitation of two salts.

At any given temperature, the point representing a system may be vertically displaced by removing some of the water from the solution. In order to precipitate ammonium sulfate instead of the double salt, it is necessary to operate at a temperature greater than that at the triple point, i.e., about 59° C.

The point A, which corresponds to about 63° C. is suitable, since it is sufficiently distant from the triple point to avoid unwanted precipitation of the double salt without requiring too much heat.

It is clear that at the point A, there is simultaneous precipitation of sodium sulfate and ammonium sulfate, but this is in the form of a mixture of the two salts rather than as a double salt."

The teachings of the Stiers et al. reference not only are insufficient to direct one to formulate ammonium sulfate in a purity of greater than 75%, but the disclosure is further completely absent of any teaching on how to obtain ammonium sulfate singly. The Stiers et al. reference does not and can not result in the generation of ammonium sulfate as a single product as is clearly possible by the teachings of the present invention.

By following the Stiers et al. methodology, one cannot generate a pure ammonium sulfate product, since the reference does not recognize the limitations of the phase equilibria of the salt system and the combination of steps necessary to overcome the inherent contaminating steps associated with this salt system. Although there is a reference to point A in FIG. 10 of Stiers et al. for the preparation of the product, it is clear that although no double salt is indicated to be in the mixture, there is no indication that the product does not include mixed salt. This is reflected in the disclosure where Stiers et al. indicates that there is simultaneous precipitation of sodium sulfate and ammonium sulfate. This is consistent with the data that Stiers et al. provides as indicated at column 12 beginning at line 21. There is no data presented where the quantity of ammonium sulfate, standing on its own, is set forth. In each case, the data presented is expressed as a proportion precipitated in a compound, i.e, combined salt inter alia. Finally, from the text set forth beginning at line 32, Stiers et al. indicates that:

" . . . From the foregoing it will be seen that the process according to the invention may be carried out by precipitating the ammonium sulfate in the form of the double salt, or as $(NH_4)_2SO_4$ simultaneously with sodium sulfate, or by precipitating it simultaneously in the form of ammonium sulfate and in the form of the double salt."

From a review of FIGS. 10 and 11 (in Stiers et. al.), the fact that no ammonium sulfate is generated singly becomes evident. No data is presented for ammonium sulfate generation; the results from practicing this methodology are only a mixed salt and a double salt. Nothing else is obtainable by practicing this method.

Finally, Kresnyak et al. in U.S. Pat. No. 5,830,442, issued Nov. 3, 1998, teach an improved process for producing ammonium sulfate. This process is attractive where energy consumption and conversion efficiency are not of primary concern. In this process, sodium sulfate is removed by significant energy input to the evaporators with subsequent cooling. The result is a 2:1 ratio of double salt to solution which then must be evaporated in order to recover ammonium sulfate.

In view of the limitations of the prior art, it is evident that a need remains for a process whereby ammonium sulfate and sodium bicarbonate can be formulated in high yield at a high purity using commercially viable, energy efficient unit operations in the proper sequence. The present invention fulfills these objectives in an elegant manner.

SUMMARY OF THE INVENTION

One object of the present invention is to provide an improved process for making ammonium sulfate and sodium bicarbonate from a solution of sodium sulfate and other minor sodium salts such as sodium sulfite, carbonate, chloride, fluoride nitrate and nitrite.

The sodium bicarbonate produced is suitable for use as a scrubbing agent for flue gas purification. In the event that food grade sodium bicarbonate is desired, the same may be washed in order to achieve United States Pharmacopoeia standards.

A further object of one embodiment of the present invention is to provide a method for recovering purified sodium bicarbonate and ammonium sulfate from a solution, containing sodium sulfate, comprising the steps of:

A) providing a solution containing sodium sulfate;
B) precipitating, in a single precipitation step, sodium bicarbonate precipitate to reduce the sodium bicarbonate concentration in solution, the solution containing ammonium sulfate, the single precipitation is accomplished bystep including;
C) removing the the sodium bicarbonate precipitate out of solution;
D) converting in a conversion step, reactants from step B) to sodium bicarbonate and conversion step including
  i) adding combined salt containing ammonium bicarbonate and Glauber's salt to inlet sodium sulfate solution;
  ii) adding carbon dioxide and ammonia gas to the the inlet sodium sulfate solution;
  iii) maintaining a ammonium to sodium ratio of not less than 1;
  iv) operating at a temperature sufficient to prevent excessive gas production; and
  v) removing the sodium bicarbonate precipitate out of solution;
E) mixing the solution from step B) with an ammonium sulfate/sodium sulfate double salt;
F) cooling the mixture from step E) to form a combined salt;
G) precipitating the combined salt and removing the combined salt out of solution;
H) removing residual bicarbonate from the solution from step G);
I) mixing the solution from step H) with mother liquor;
J) cooling the mixture from step I) to precipitate double salt;
K) separating precipitated double salt from the solution and recycling to step E); and
L) recovering ammonium sulfate from the solution of step K) by concentrating the solution.

In terms of the acidification, any suitable acid may be used to remove residual bicarbonate and/or carbonate compounds. This results in the liberation of carbon dioxide gas which then may be recycled into the sodium bicarbonate precipitation step. An acid useful to achieve this goal is sulfuric and it will be appreciated by those skilled in the art that the sulphuric acid employed will be of relatively high molarity and of similar ionic composition to the solution being altered.

The unit operations and sequencing as set forth herein provide for nearly 100% conversion of sodium sulfate and ammonium bicarbonate to ammonium sulfate and sodium bicarbonate in a commercially viable manner.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE PREFERRED EMBODIMENTS

Figure 1:
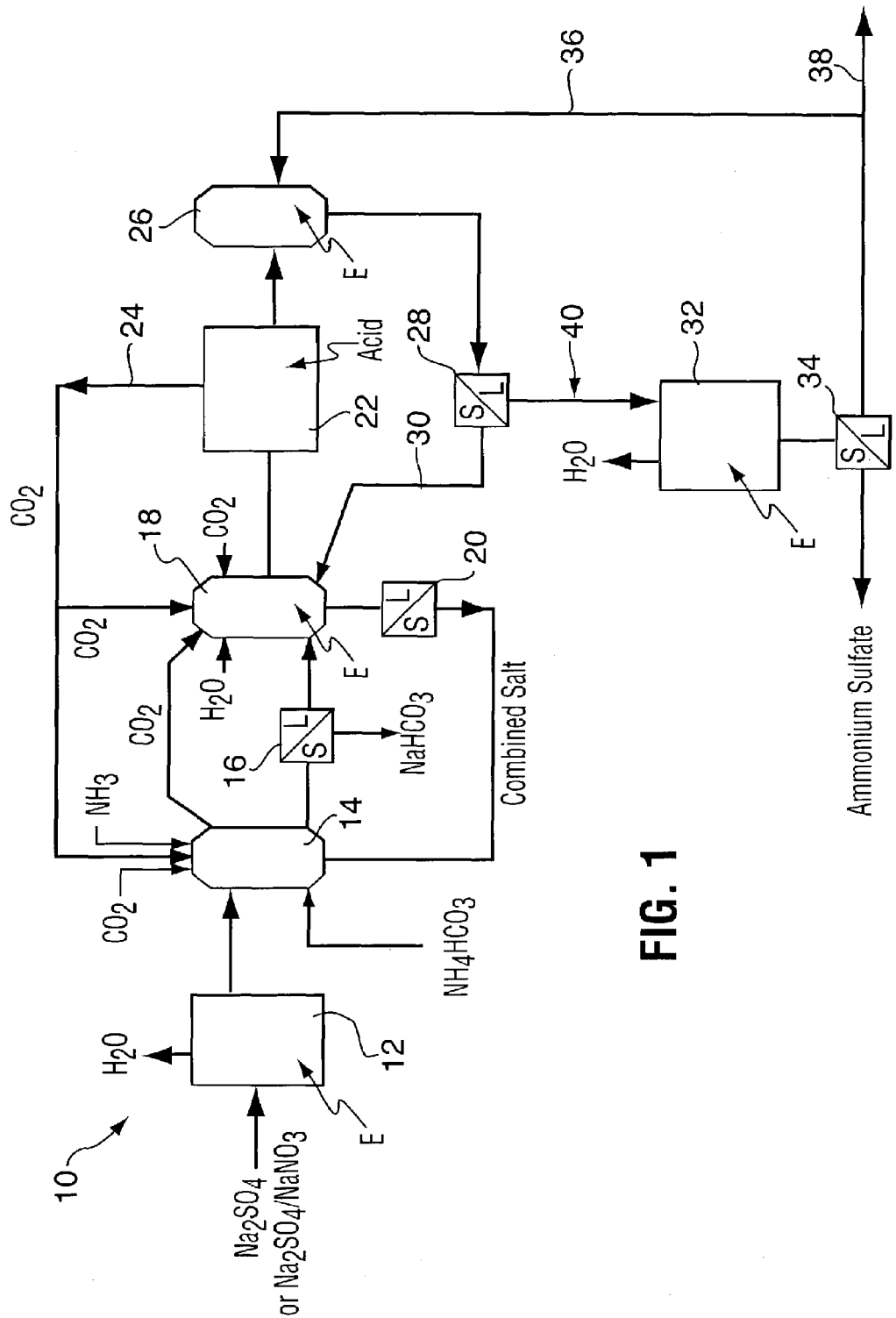
FIG. 1 is a process flow diagram according to one embodiment of the present invention.

In FIG. 1, the overall process in accordance with a first embodiment is illustrated and globally referenced as numeral 10. As a first step, which is optional, the pure or contaminated solution may be pretreated at 11 to remove sodium metals which may be present such as sodium fluoride, chloride, etc. The sodium sulfate solution may be concentrated. In the process flow diagram shown, a simple evaporation drives off moisture and thus increases the concentration in solution. Any suitable means may be used to achieve this function.

It has been found to be desirable to concentrate the inlet solution such that the feed to the sodium bicarbonate crystallizer (including all recycles) is saturated or nearly saturated in order to maximize the once through conversion of the sodium sulfate and ammonium bicarbonate or carbon dioxide and ammonia feeds to the crystallizer. This detail is important in minimization of the size of the recycle streams required to achieve 100% conversion of the inlets. As one skilled in the art will realize, minimization of recycle stream size minimizes energy consumption. This fact was not recognized in the prior art and when combined with the previously unrecognized need to ensure the optimal ammonium to sodium ratio in the sodium bicarbonate crystallizer, can increase the once through conversion of the reactants to sodium bicarbonate from as low as 30% to as high as 65%. By taking care to maximize the once through conversion, the energy consumption of the process can be reduced by a factor of 10.

It has been found that the optimal ammonium to sodium feed ratio to the sodium bicarbonate precipitation step is that which results in a slight excess of ammonium (ratio of between 1.01 and 1.10). Although on a once through basis, an ammonium to sodium ratio of 0.912 results in the greatest once through conversion to sodium bicarbonate, the large recycle stream sizes that result from the excess sodium rapidly deteriorate process economic viability.

The preparation of the sodium sulfate will occur in vessel 12 and once prepared, the solution is then transferred to a precipitator 14 for precipitating sodium bicarbonate. This precipitation is accomplished by the addition of carbon dioxide and ammonia gas or solid ammonium bicarbonate together with combined salt (ammonium bicarbonate and Glauber's salt derived from a further unit operation discussed hereinafter) in the correct combination to achieve the previously discussed optimal ammonium to sodium ratio. In the further combined salt precipitation step (vessel 18), double salt contamination (containing ammonium sulfate product) in the combined salt precipitate will reduce the overall process efficiency by reducing the once through efficiency of the sodium bicarbonate crystallizer. To one skilled in the art, the inclusion of double salt in the combined salt will pull the reactant point on the Janecke (see FIG. 4 and Example 1) towards the sodium bicarbonate/ammonium bicarbonate solubility line which by the use of the lever rule will reduce the once through process efficiency. This point was overlooked in the prior art and is an important aspect in respect of the novelty of the present invention. In addition, it has been found optimal to maintain the temperature of the combined slurry in vessel 14 in the optimal range for sodium bicarbonate precipitation of 35 to 40° C.

In an example to follow, it will be illustrated how the application of the chemical equilibrium involved in the sodium bicarbonate precipitation step may be used to maximize the once through conversion to sodium bicarbonate in vessel 14. The ability to maximize the once through conversion in the sodium bicarbonate precipitator allows one skilled in the art to optimize the economics of the invention and ensure economic viability. The sodium bicarbonate precipitate and solution are then separated in a separator 16 where the solid is separated and comprises high purity sodium bicarbonate.

In terms of the liquid from separator 16, the same is then mixed with an ammonium sulfate/sodium sulfate double salt derived from a further unit operation and possibly some water and cooled (optimally between –2 C and 2 C) in vessel 18 resulting in the precipitation of an ammonium bicarbonate/Glauber's salt combined salt. This combined salt precipitation step to optimize and stabilizer the process is not part of the prior art. The temperature range of –2 to 2 C is optimal but it should be apparent to one skilled in the art that a wider temperature range will work, although not as efficiently. The combined salt is separated from the solution in separator 20. The combined salt is then reintroduced into the sodium bicarbonate precipitation stage in vessel 14 as the ions in the combined salt represent unused reactants and not products (ammonium sulfate). As one skilled in the art will recognize, the water and bicarbonate concentration in the combined salt precipitation step are extremely important. If the water and bicarbonate concentration are not correct, the sodium sulfate/ammonium sulfate double salt could also precipitate and contaminate the combined salt. As such, the correct amount of water and bicarbonate in the form of carbon dioxide have to be added to this step to ensure the precipitation of combined salt only. The amount of water and carbon dioxide required is not obvious. Possible sources of carbon dioxide to be added to vessel 18 include the carbon dioxide produced in the sodium bicarbonate precipitation step, the carbon dioxide derived from the further bicarbonate removal step or an external carbon dioxide source.

The precipitation and recycling of the combined salt is essential to obtaining nearly 100% conversion of the sodium salt feed to sodium bicarbonate in an economical manner. This fact was not recognized in the prior art. Without the combined salt precipitation step, all of the unconverted bicarbonate from vessel 14 would feed ahead to the bicarb removal step (denoted as 22) and would have to be recovered and recycled as gaseous carbon dioxide. One skilled in the art will readily recognize that it is far less energy intensive to recycle the unconverted bicarbonate as a solid rather than a gas. In addition, if double salt containing ammonium sulfate (a process product) contaminates the combined salt precipitate, then ammonium sulfate is unnecessarily recycled back to the beginning of the process resulting in further deterioration of the viability of the process through increased energy consumption due to reduced once through conversion.

The solution from vessel 18 is then treated by an acidification operation, broadly denoted by numeral 22 to remove residual bicarbonate from the solution. Removal of the residual bicarbonate is essential to the production of pure ammonium sulfate fertilizer in a further unit operation. The acidification may comprise any suitable acid treatment, however, one acid which has been found to be particularly useful is sulfuric. Once the sulfuric acid contacts the solution, the carbonates are liberated from the solution as carbon dioxide because of the pH dependent equilibrium between bicarbonate ion and aqueous carbon dioxide. The carbon dioxide is then returned to vessel 14 or 18 via line 24. The solution is then mixed with mother liquor derived from the downstream ammonium sulfate concentration step (denoted as 32), passed to vessel 26 and cooled (optimally between –2 C and 2 C) to precipitate double salt. The subsequent solution and double salt solid are separated by separator 28. The temperature range of –2 to 2 C is optimal but it should be apparent to one skilled in the art that a wider temperature range will work, although not as efficiently.

Figure 7:
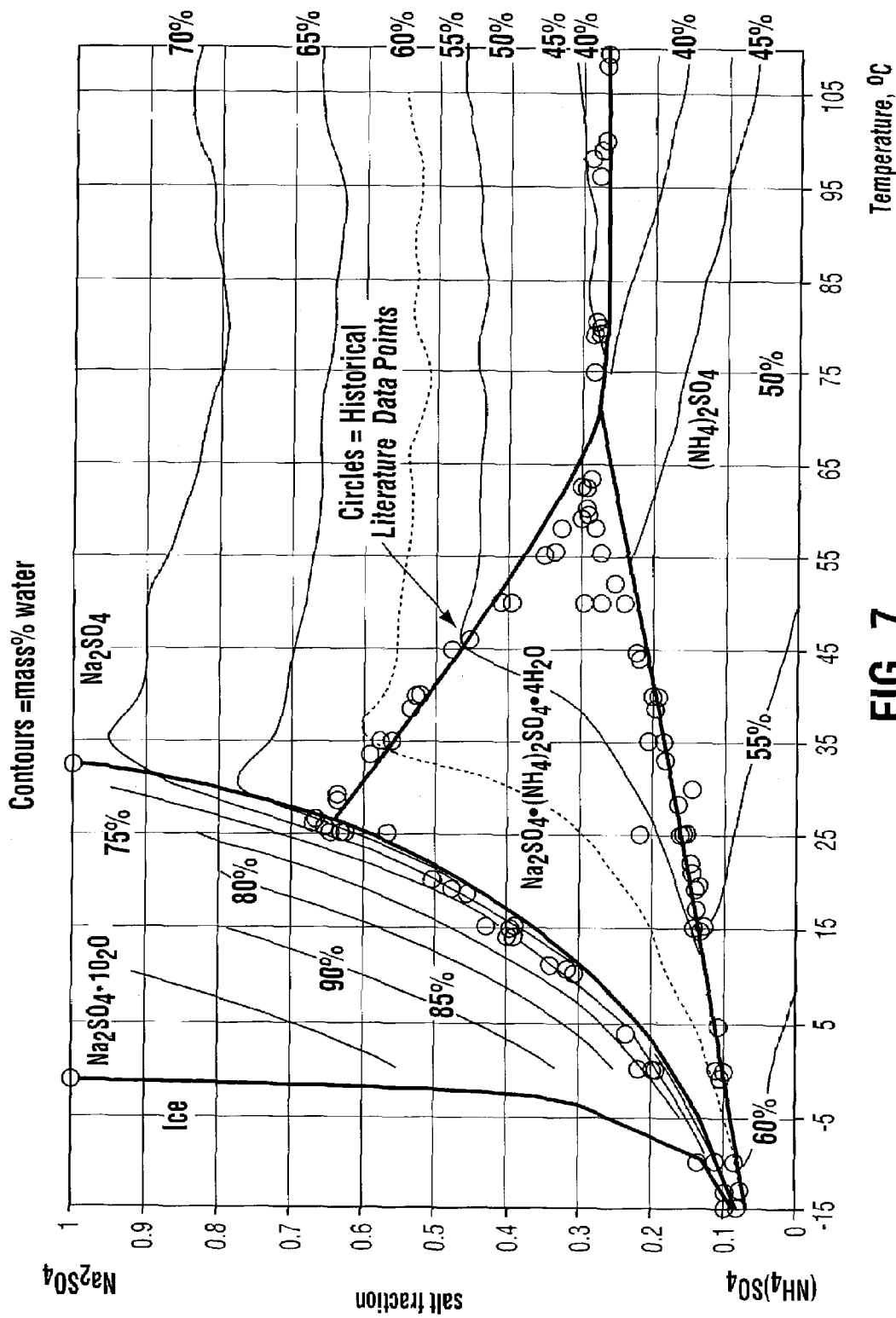
FIG. 7 is a T-X (temperature-composition) phase diagram that represents the chemical equilibrium involved in the production of high quality ammonium sulfate from a solution containing ammonium, sulfate and sodium ions.
Figure 8:
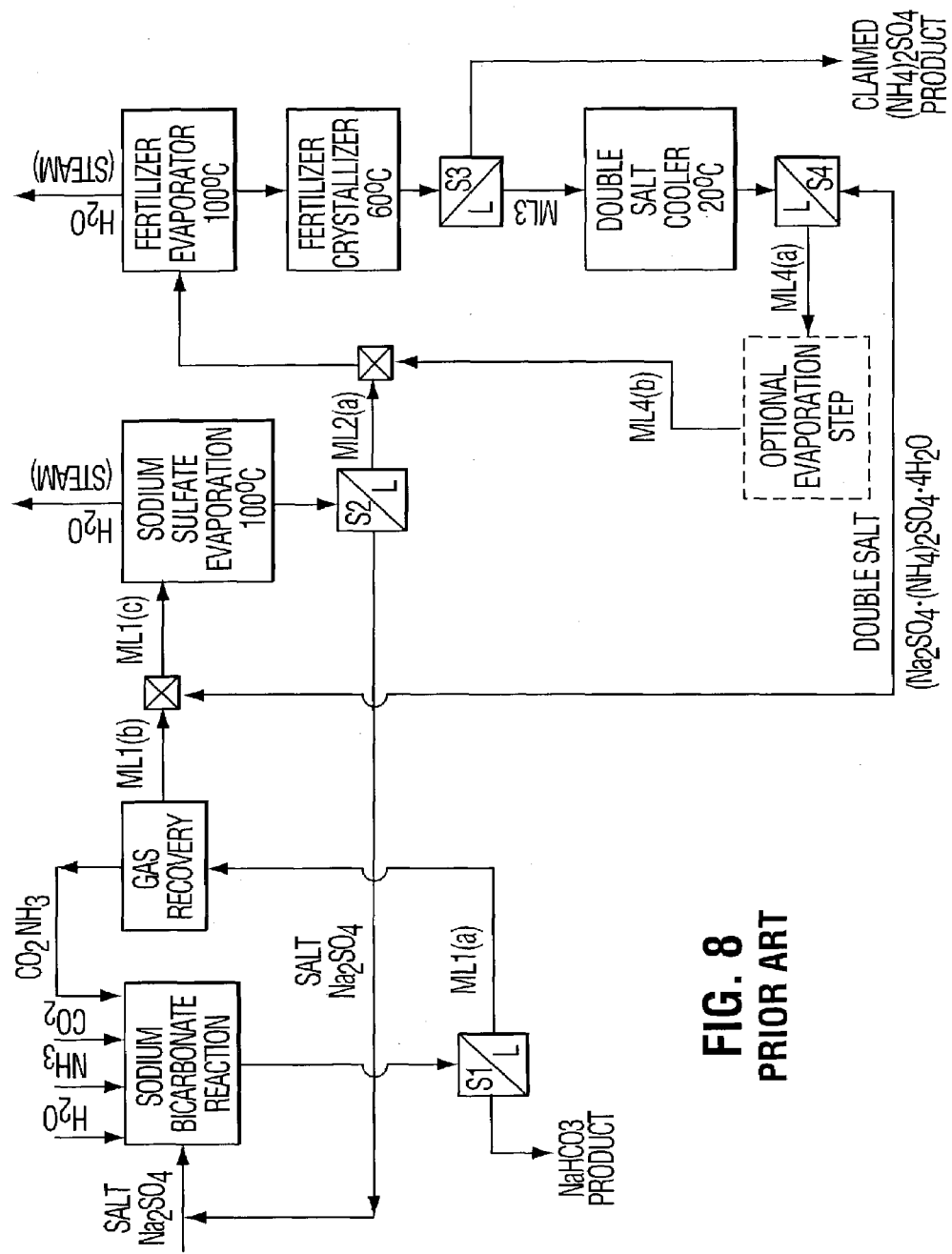
FIG. 8 is a process flow diagram according to the prior art.
Figure 9:
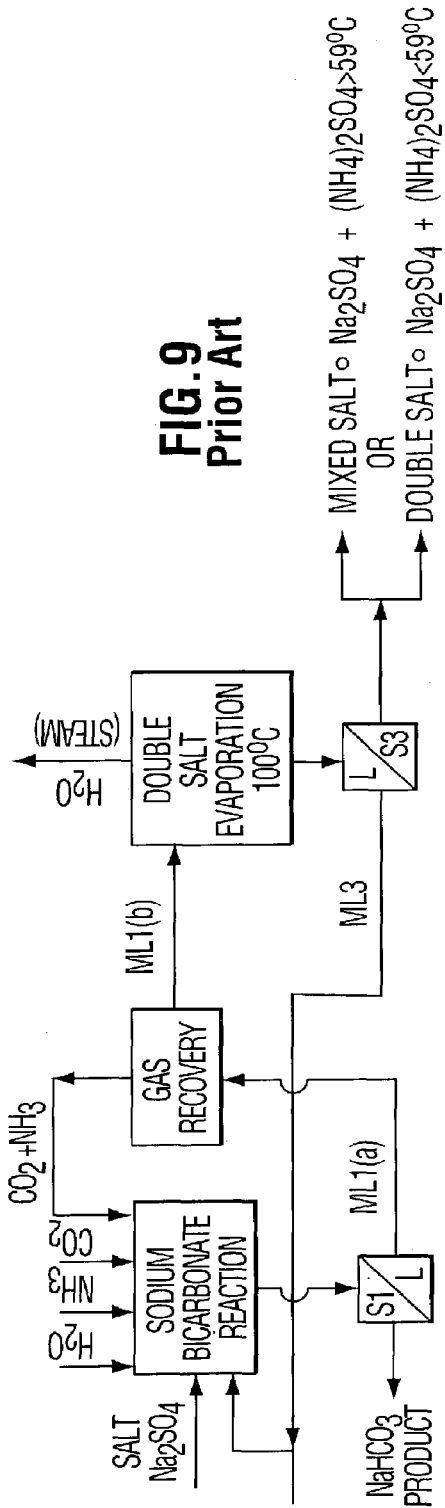
FIG. 9 is another process flow diagram according to the prior art.
Figure 10:
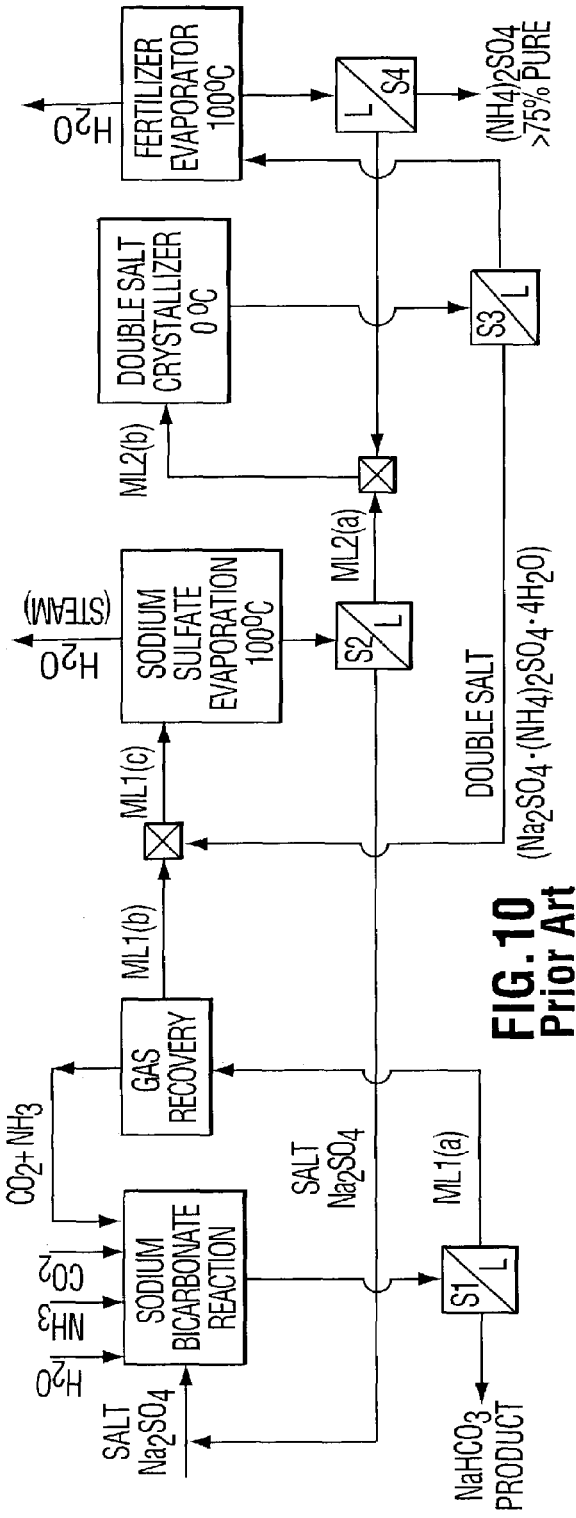
FIG. 10 is a further process flow diagram according to the prior art.

The double salt is returned via line 30 to the combined salt precipitator vessel 18. The precipitation of double salt in this step is essential to the ability of the invention to produce high quality ammonium sulfate fertilizer product. If the amount of sodium in the solution feeding the ammonium sulfate precipitation step (step 32) is not controlled (by precipitating and recycling the double salt, it is not possible to precipitate high quality ammonium sulfate. Example 4 to follow will illustrate the importance of understanding how the sodium content of the solution feeding the ammonium sulfate precipitation step has to be controlled to produce high quality ammonium sulfate. This was not previously appreciated in the prior art. FIG. 7 illustrates the chemical equilibrium involved.

The solution from separator 28 is exposed to a concentration operation, globally denoted by numeral 32, where the ammonium sulfate bearing solution is concentrated to cause ammonium sulfate precipitation. This could be achieved by any known means such as straight forward evaporation. The solution is then separated from the solid by separator 34. The solid comprises high quality ammonium sulfate fertilizer wet cake which can then be washed and formulated into a marketable form. The solution is returned to the double salt precipitator via line 36.

In the event that the inlet source of sodium sulfate was not derived from a pure sodium sulfate source, for example, from a flue gas purification process utilizing dry and/or wet sodium bicarbonate scrubbing, the same inlet source may contain nitrate compounds and other impurities such as but not limited to sodium chloride, sodium fluoride, etc. If these impurities are present they are purged from the system at 38. This purge does not degrade the economics of the process as the purge itself is a valuable fertilizer product since it contains ammonium sulfate, ammonium nitrate and other ammonium salts in solution. The impurities (Cl, F, Na, etc.) will be in low enough concentrations when the inlet sodium sulfate solution is derived from for example, a flue gas source to allow the stream to be sold as a fertilizer product.

Figure 2:
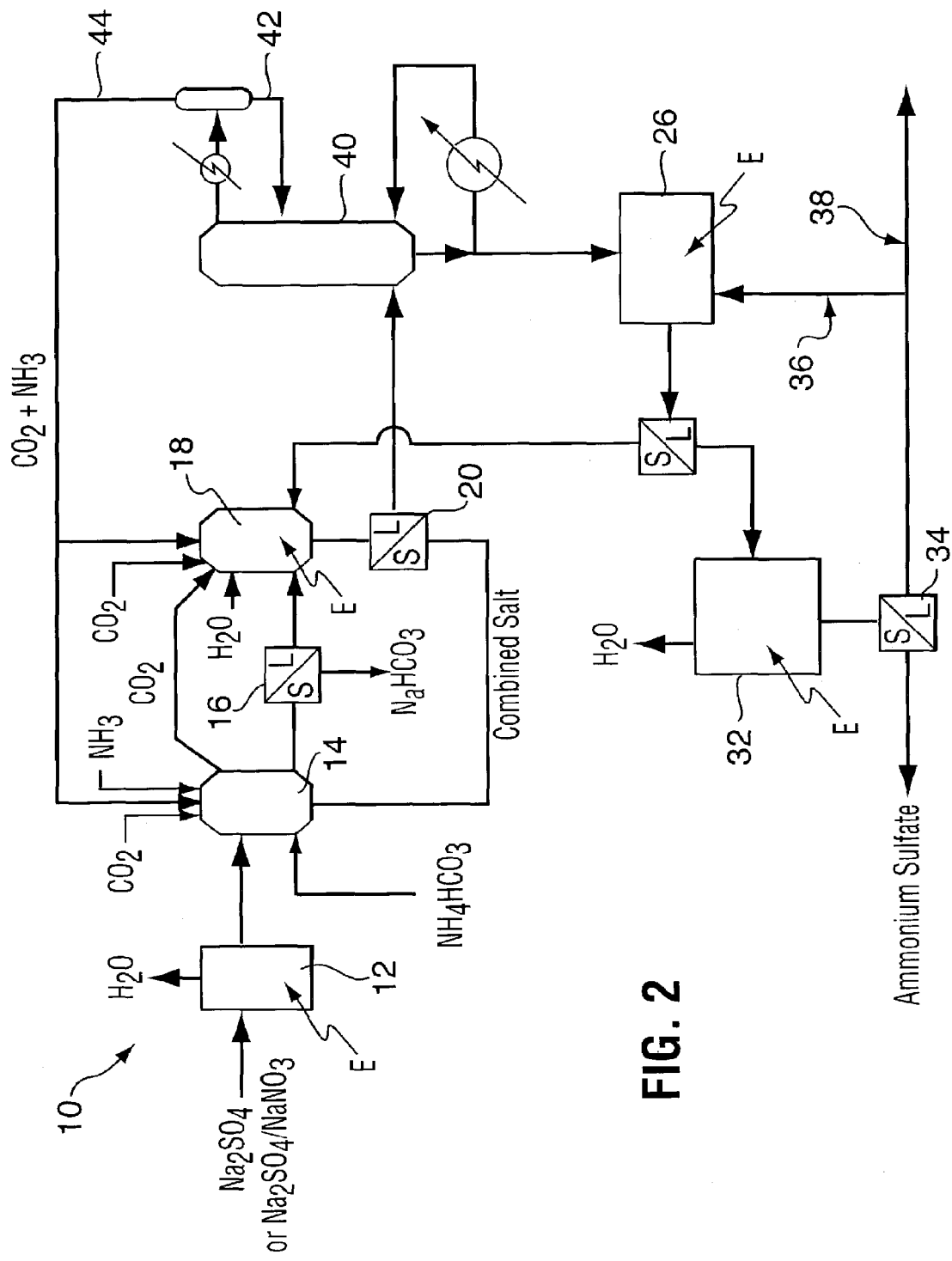
FIG. 2 is a process flow diagram of yet another embodiment of the present invention.

As an alternative, FIG. 2 illustrates a different possibility with respect to the preparation of the sodium bicarbonate and ammonium sulfate.

In FIG. 2, the solution from separator 20 is passed into a bicarbonate stripping tower 40 which may be of the packed or tray type. The tower can be either a refluxed or non refluxed distillation tower. The carbon dioxide and ammonia gases (and water vapor) liberated from solution are recycled via line 44 to vessel 14 or vessel 18. As in the acidification option, the bottoms liquid from the stripper 40 is treated in vessel 26 in order to precipitate the double salt. The rest of the circuit follows the same series of unit operations as those that have been set forth in the discussion for FIG. 1.

In terms of temperature, the overheads from the stripping tower should be kept as low as possible although the process will work over a large temperature range. As low a temperature as possible is ideal because the lower the temperature, the less water carry over there is with the carbon dioxide and ammonia gas. As one skilled in the art will recognize, the minimization of water recycle in the process will minimize energy consumption and equipment size. The practical limit to the minimization of the stripper overhead temperature and water carry over is the fact that if the temperature drops too far below 65° C., solid ammonium bicarbonate or other ammonium/carbonate salts will precipitate in the line.

In the prior art, the fact that it is far less energy intensive to recycle un-reacted bicarbonate in the solid form (as ammonium bicarbonate) compared to carbon dioxide gas was not recognized. In the present invention, this is overcome by locating the bicarbonate recovery step (acidification or stripper) after the combined salt precipitation step.

Figure 1A:
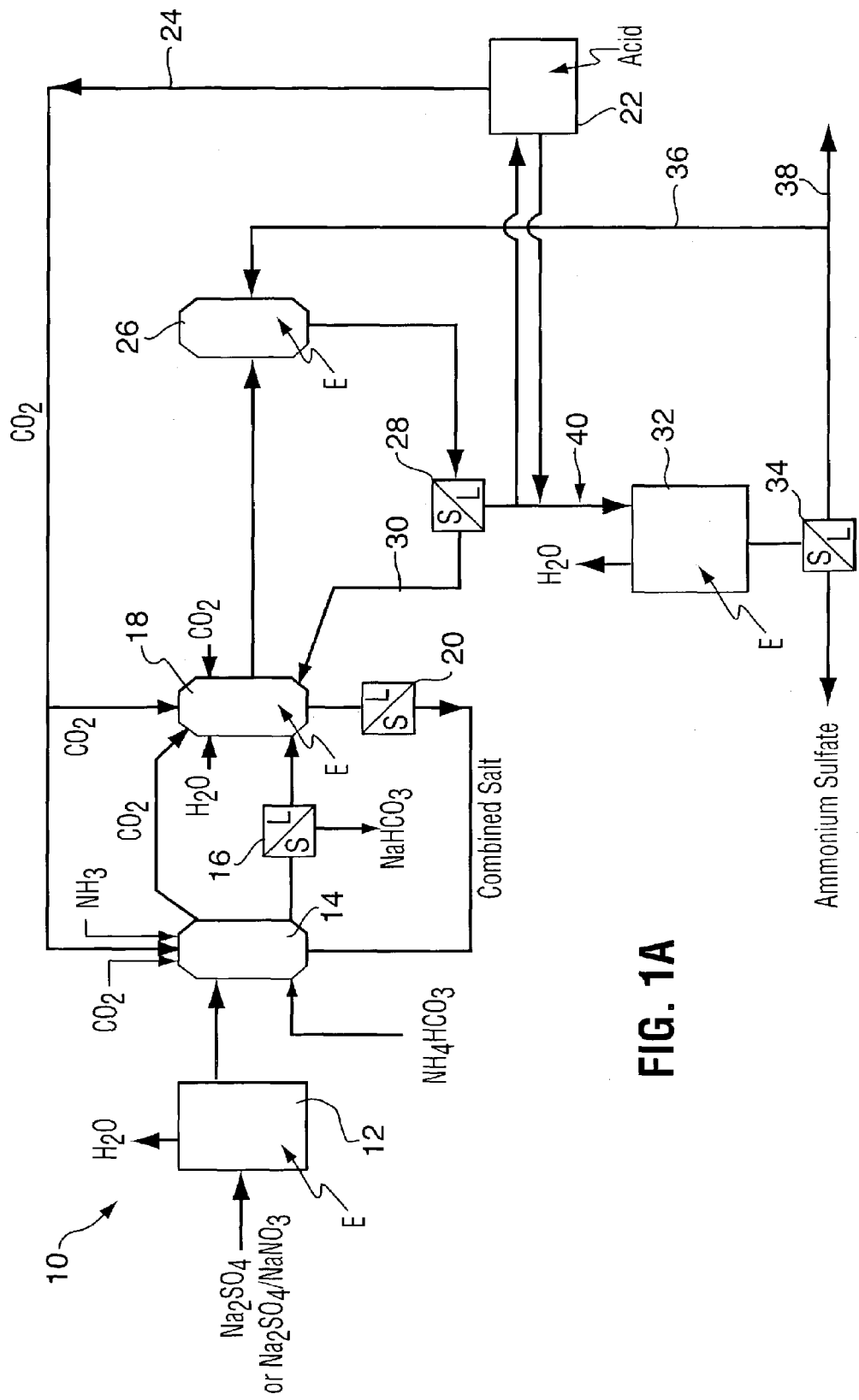
FIG. 1A is a process flow diagram of a further embodiment of the present invention.
Figure 2A:
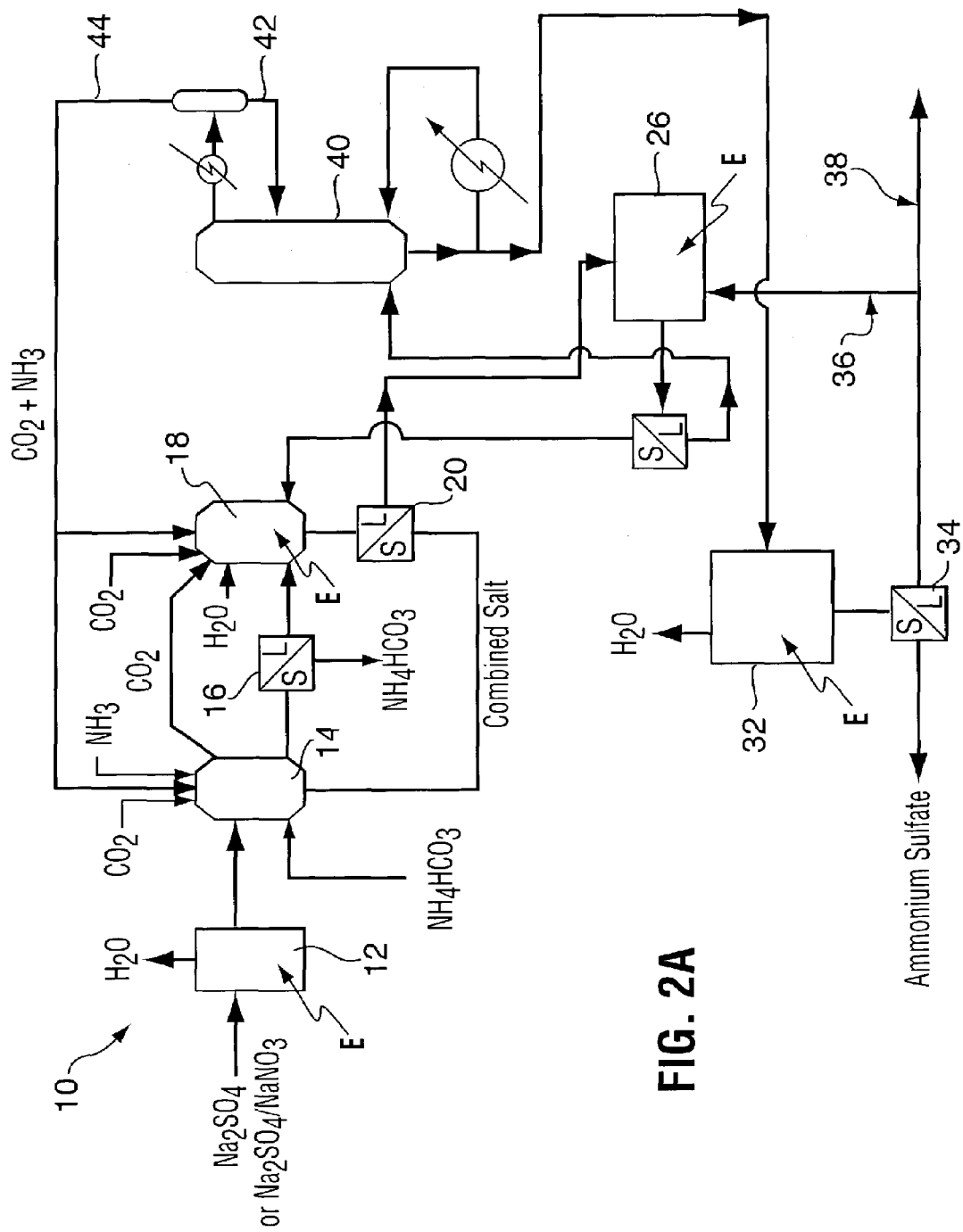
FIG. 2A is a process flow diagram of a another embodiment of the process of the present invention.

In terms of further alternatives, the bicarbonate removal step (stripper or acid addition) could be located downstream of the double salt crystallization step (vessel 26) (see FIGS. 1A and 2A). Where practical, this configuration would allow for reduced energy consumption.

Figure 3:
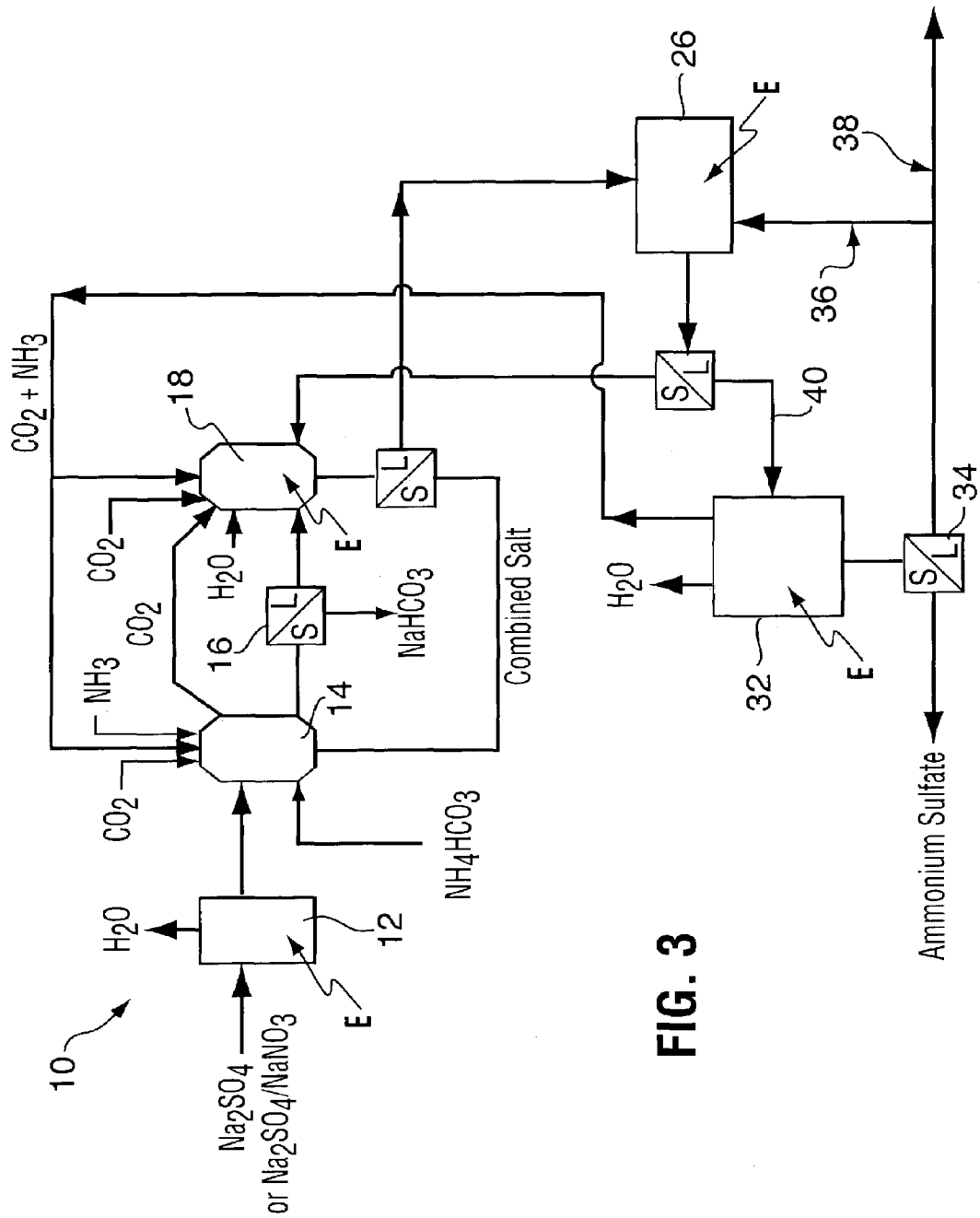
FIG. 3 is a further process flow diagram of one embodiment of the process of the present invention.

An additional further alternative would be to carry out the bicarb removal step simultaneously with the ammonium sulfate solution concentration step (denoted as 32). This would eliminate the need for a separate acidification or stripping unit operation for the removal of bicarb (see FIG. 3).

In respect of temperatures, the combined salt and double salt precipitators have been indicated to optimally function in a range of −2° C. to 2° C. The sodium bicarbonate precipitation step has been indicated to optimally function in the range of 35 to 40 C. To one skilled in the art, it should be apparent that the present invention will work outside of these temperature ranges but at reduced efficiency.

With respect to the individual precipitators and equipment choice, this will depend upon the size of the circuit, desired output, daily quantity, among a host of other factors.

EXAMPLES

Example 1

Determination of Optimal Ammonium to Sodium Ratio in the Sodium Bicarbonate Precipitation Step The following example illustrates how the complex phase equilibrium chemistry involved in the present invention can be used to determine the optimum ammonium to sodium ratio in the sodium bicarbonate precipitation step. The understanding of the chemistry demonstrated by this example is required for all unit operations within the process.

The following equilibrium reaction equations represent the process in the sodium bicarbonate precipitation step (using either solid ammonium bicarbonate or carbon dioxide and ammonia gas):

$$Na_2SO_4 + 2NH_4HCO_3 \leftrightarrow 2NaHCO_3 + (NH_4)_2SO_4$$

$$Na_2SO_4 + 2NH_3 + 2CO_2 + 2H_2O \leftrightarrow 2NaHCO_3 + (NH_4)_2SO_4$$

In order to understand the complexity of the phase equilibrium behavior described in this reaction, a graphical representation of the system is required. The reciprocal salt pair quaternary system described in this reaction can be represented on an isothermal 'space model'. However, these space models are difficult to use from an engineering perspective and do not easily provide a way of understanding the system as a complete process.

One simplification of the 'space model' is known as a Janecke diagram or projection. In a Janecke diagram, the salt and water curves of the 'space model' are projected onto a two dimensional graph.

Figure 4:
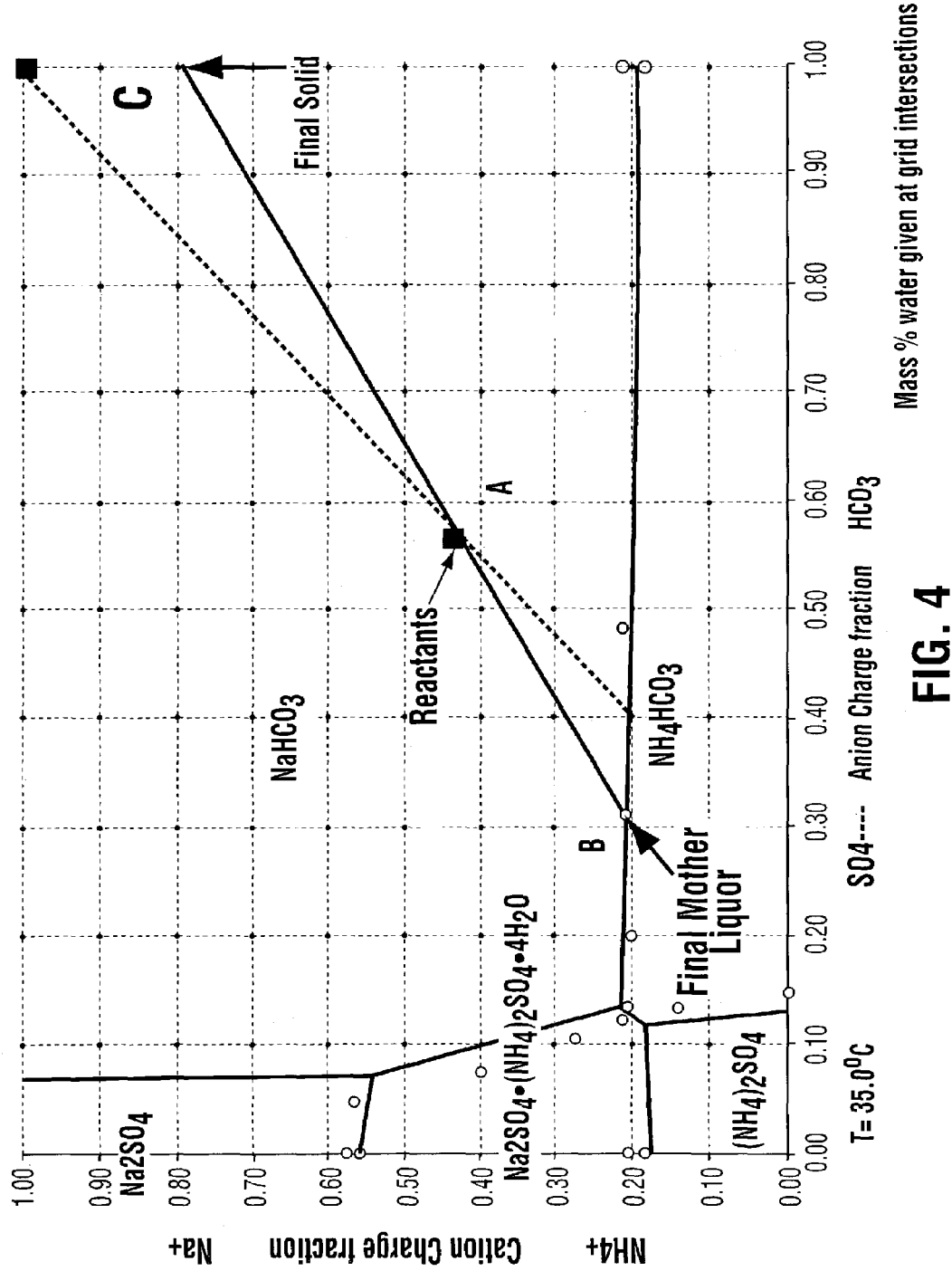
FIGS. 4 and 5 are Janecke diagrams that represent the chemical equilibrium involved in the sodium bicarbonate precipitation step.

The Janecke diagram shown in FIG. 4 represents the phase equilibrium in the sodium bicarbonate crystallizer at a temperature of 35° C. The abscissa (X axis) is the charge fraction of bicarbonate ions (and aqueous carbon dioxide, carbonate ions ($CO_3^{2-}$) and carbamate ions ($NH_2COO^-$)) calculated as follows:

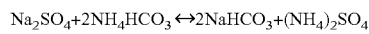

$$X = \text{Mols } HCO_3^-/(\text{Mols } HCO_3^- + (2 \times \text{Mols } SO_4^{2-}))$$

The ordinate (Y axis) is the charge fraction of sodium ions calculated as:

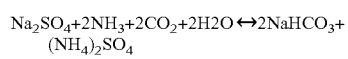

$$Y = \text{Mols } Na^+/(\text{Mols } Na^+ + \text{Mols } NH4^{+*})$$

(*includes aqueous ammonia and carbamate ions)

The saturated water content in weight percent can be shown at the grid intersections. However, for clarity this feature is not included in this figure.

The enclosed areas on the graph represent precipitation areas of the salt indicated with the pure component composition represented at each corner. In these areas, the solution is in equilibrium with the solid salt indicated if the water concentration is low enough to result in precipitation of the salt. The curves or mutual solubility lines on the graph represent solutions in equilibrium with the two salts on either side of the line. The intersection of two lines or curves represents solutions in equilibrium with three salts and is known as an invariant point.

The Janecke diagram in FIG. 4 was created using a UNIQUAC (Universal Quasi Chemical) computer model.

The small circles on the diagram represent measured data points from various published sources lending credibility to the computer model used to generate the diagram.

A crystallizer feed (reactants) contains the following moles of the various ions and 760 g of water:

$Na^+$ ions=4.219 mols (97.0 g—MW=23 g/mol)
$NH_4^+$ ions=5.512 mols (99.2 g—MW=18 g/mol)
$HCO_3^-$ ions=5.590 mols (341.0 g—MW=61 g/mol)
$SO_4^{2-}$ ions=2.115 mols (203.0 g—MW=96 g/mol)
Total Ions=740.2 g
Water=760.0 g
Total Feed (Reactants)=1500.2 g
The cation charge fraction is:

$$X=4.219/(4.219+5.512)=0.43$$

The anion charge fraction is:

$$Y=5.590/(5.590+(2\times2.115))=0.57$$

When this point is plotted on the Janecke diagram (see FIG. 4) it falls on the sodium bicarbonate precipitation area. Therefore, the first solid to form will be sodium bicarbonate if the water content is less than 78 wt % as indicated by the grid points (not shown in the diagram for clarity). In this example, the water content of the reactants is 50.7 wt %. Therefore, sodium bicarbonate will precipitate. Point (1.0, 1.0) in the right top corner represents the composition of the first solid which we know to be one hundred percent sodium bicarbonate. The composition of the mother liquor will change along the dashed line drawn through points (0.43, 0.57) and (1.0, 1.0) until the mother liquor anion and cation charge fraction point and water concentration meet. The three points must form a straight line through the initial reactants point termed an operating line. This operating line represents a unit operation in the process.

If the ammonium bicarbonate/sodium bicarbonate saturation line is reached before the mother liquor charge fraction point and water concentration meet, then ammonium bicarbonate will begin to co-precipitate. The composition of the mother liquor will then change along the sodium bicarbonate/ammonium bicarbonate saturation line towards the left. The composition of the solid will begin to change along the secondary 'Y' axis (1,Y2), moving down from one hundred percent sodium bicarbonate.

The final operating line and end point solid and mother liquor can be found by trial and error utilizing the lever rule. The lever rule is a way of calculating the proportions of each phase on a phase diagram. It is based on conservation of mass and can be proven mathematically. For this example, the lever rule demonstrates that the relative mass amounts of solid and mother liquor are inversely proportional to the distance of the end point of each phase from the initial reactants point.

In this example, the mother liquor and solid end points are at the ends of the solid line drawn through the initial reactants point (see FIG. 4).

The preceding illustrates how to use the Janecke diagram. The following illustrates how the Janecke diagram can be used for process optimization.

Figure 5:
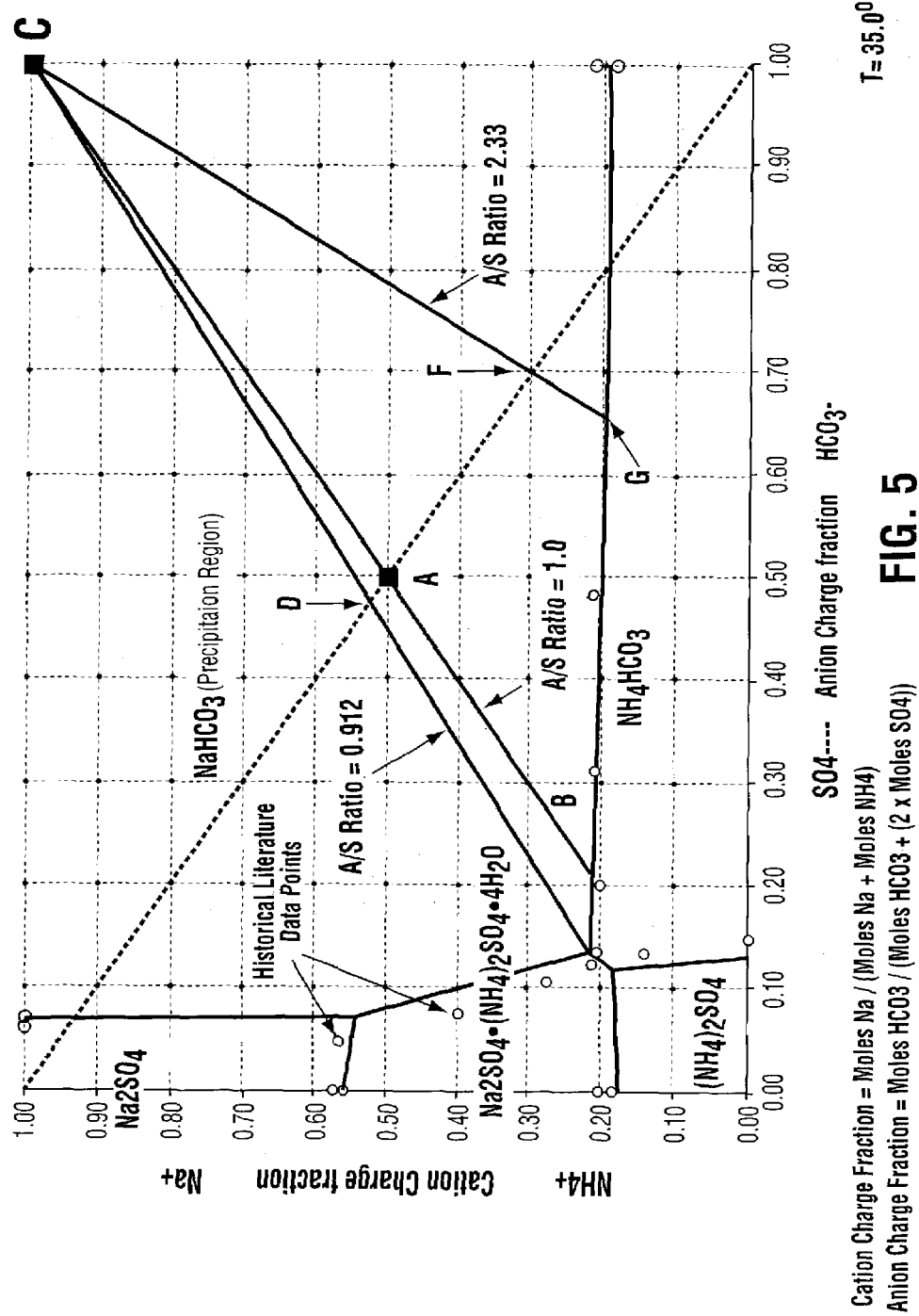

Any mixture of sodium sulfate and sodium bi-carbonate will result in an initial starting point (reactants) that falls on the diagonal line drawn between points (0,1) (100% sodium sulfate) and (1,0) (100% ammonium bicarbonate) (see dashed line in FIG. 5).

The goal is to precipitate sodium bicarbonate, so the composition of the feed (reactants) has to be adjusted such that the plot of the reactants anion and cation charge fractions falls on the sodium bi-carbonate saturation surface. The following illustrates how to determine the optimal reactants starting point or ammonium to sodium ratio.

If the feed has an equi-molar ratio of ammonium to sodium (A/S ratio=1.0) then the plot of the reactants charge fractions falls on the point (0.5,0.5) (point A in FIG. 5). If the water content in the feed is adjusted such that precipitation stops just at the sodium bicarbonate/ammonium bicarbonate saturate line, we know that the resultant mother liquor and solids fall at points B and C respectively. The mass of sodium bicarbonate produced can then be determined by using the lever rule.

Looking at the diagram, the observation can be made that a feed with an excess of sodium up to the point where the end point mother liquor stops just short of the sodium bicarbonate/ammonium bicarbonate/double salt ($Na_2SO_4$—$(NH_4)_2SO_4$—$4H_2O$) invariant point (point E) will provide the maximum "once through" yield of sodium bicarbonate. This feed point is shown as 'D' on the diagram. With a feed corresponding to point D (and water content adjusted such that precipitation stops when the end point mother liquor just reaches the triple point), the ratio of the distances on the Janecke (lever rule) results in the maximum amount of sodium bicarbonate produced. Any feed with more or less excess sodium will result in less sodium bicarbonate production. The following three examples will illustrate this point. To simplify the analysis, it is assumed in all cases that precipitation will stop when the mother liquor reaches the sodium bicarbonate/ammonium bicarbonate saturation line. Therefore, the solid produced will always be one hundred percent sodium bicarbonate.

Case 1: Ammonium to Sodium Molar Ratio=1.0

If a feed has 1 mol of Na+ and an ammonium to sodium ratio of 1.0, then the feed composition is as follows:

$Na^+$=1 mol (23.0 g)
$NH4^+$=1 mol (18.0 g)
$HCO_3^-$=1 mol (61.0 g)
$SO_4^{2-}$=0.5 mol (48.0 g)

Using the Janecke and the lever rule, the mass of solid sodium bicarbonate produced is 53.7 g. We know this solid is 100% sodium bicarbonate. Therefore, $Na^+$ and $HCO_3^-$ conversion to sodium bicarbonate is 63.9%.

Case 2: Maximum Once Through Sodium Bicarbonate Production (A/S Molar Ratio=0.912)

As discussed, point D in FIG. 5 represents the feed that will result in the maximum production of sodium bicarbonate on a once through basis. Point D has Janecke coordinates of (0.477,0.523). If a feed has 1 mol of $Na^+$, then it contains 0.5 mols of $SO_4^{2-}$. The moles of $NH_4^+$ and $HCO_3^-$ are equal and can be found from:

$$0.523=\text{Mols Na}^+/(\text{Mols Na}^+ + \text{Mols NH4}^+)$$

or $$0.477=\text{Mols of HCO}_3^-/(\text{Mols of HCO}_3^- + (2\times\text{Mols SO}_4^{2-}))$$

These give 0.912 moles of $NH_4^+$ and $HCO_3^-$ and an ammonium to sodium molar ratio of 0.912. Therefore, we have a feed with the following composition:

$Na^+ = 1$ mol (23.0 g)
$NH_4^+ = 0.912$ mol (16.4 g)
$HCO_3^- = 0.912$ mol (55.6 g)
$SO_4^{2-} = 0.5$ mol (48.0 g)
Total = 143.0 g As before, using the Janecke and the lever rule, the mass of solid sodium bicarbonate produced is 55.6 g, sodium conversion is 66.2% and bicarbonate conversion is 72.6%. These are the highest conversions of sodium and bicarbonate possible on a once through basis.

Case 3: Ammonium to Sodium Molar Ratio of 2.33

Point F in FIG. 5 represents a feed with a large excess of ammonium. If a feed has 1 mol of $Na^+$ then it contains 0.5 moles of $SO_4^{2-}$. The mols of $HCO_3^-$ and $NH_4^+$ are equal and can be found from:

0.3=Mols Na+/(Mols Na++Mols NH4+)

or 0.7=Mols of HCO3−/(Mols HCO3−+(2×Mols SO42−)

These give 2.33 moles of $NH_4^+$, 2.33 moles of $HCO_3^-$ and an ammonium to sodium ratio of 2.33. Therefore, we have a feed with the following composition:

$Na^+ = 1$ mol (23.0 g)
$NH_4^+ = 2.33$ mol (41.9 g)
$HCO_3^- = 2.33$ mol (142.1 g)
$SO_4^{2-} = 0.5$ mol (48 g)
Total = 255.0 g Again, using the Janecke and the lever rule, the mass of sodium bicarbonate produced is 30.3 g, sodium conversion is 36.1% and bicarbonate is 15.5%.

These examples illustrate that on a once through basis, an ammonium to sodium ratio of 0.912 results in the maximum once through conversion of reactants to solid sodium bicarbonate. However, these examples do not show the magnitude of the combined salt and double salt recycle streams that result from the different feed ammonium to sodium ratios. It has been found that a slight excess of ammonium is favorable because when there is even a slight excess of sodium, the recycles become extremely large. This is because ammonia is very volatile in comparison to sodium and results in a final ammonium to sodium ratio of 1.0. Sodium is non-volatile and will stay in solution and build-up in the system. From an equipment capital cost and energy consumption point of view, these large recycles would deteriorate the economics.

The determination of the fact that a slight excess of ammonium is favorable was done utilizing a process simulator because to try and determine this fact with hand calculations would be impractical due to the time required. A thorough understanding of the chemistry combined with the utilization of a powerful process simulator has enabled the optimum ammonium to sodium ratio to be found. The process simulator Hysis™ coupled with the OLI™ property package was used. It has been found that Hysis™ matches very closely to measured analytical data for all of the chemical equilibrium involved in the present invention. The following table illustrates how well Hysis™ matches published measured data (which the Janecke is based on) for the preceding examples.

TABLE 1

Determination of Optimal Ammonium To Sodium Ratio-
Hysis vs Janecke Diagram

|  | Janecke | Hysis | % Difference |
|---|---|---|---|
| Example 1 (A/S Ratio = 1.0) | | | |
| Solid Produced (g) | 53.7 | 53.1 | 1.1 |
| Sodium Conversion (%) | 63.9 | 63.2 | 1.1 |
| Bi-carbonate Conversion (%) | 63.9 | 63.2 | 1.1 |
| Example 2 (A/S Ratio = 0.912) | | | |
| Solid Produced (g) | 55.6 | 53.8 | 3.2 |
| Sodium Conversion (%) | 66.2 | 64.0 | 3.2 |
| Bi-carbonate Conversion (%) | 72.6 | 70.3 | 3.2 |
| Example 3 (A/S Ratio = 2.33) | | | |
| Solid Produced (g) | 30.3 | 27.0 | 11.1 |
| Sodium Conversion (%) | 36.1 | 32.1 | 11.1 |
| Bi-carbonate Conversion (%) | 15.5 | 13.8 | 11.1 |

Therefore, because Hysis™ is known to match measured equilibrium data applicable to the present invention, its results are used rather than hand calculations and Janecke diagrams for the remaining examples.

In addition to the use of a process simulator to model and understand the process, proprietary lab testing of the chemistry involved in the present invention was done. This testing provided additional verification of the validity of the results of the simulator and also showed that the chemical processes involved in the present invention are equilibrium based and are not limited kinetically. This fact is important. If the chemistry was kinetically limited, this would deteriorate the economic viability of the process. The following table provides a sample of how well Hysis matches the results of the proprietary lab testing.

TABLE 2

Comparison of Hysis Results to Results of Proprietary Testing

|  | Proprietary Testing | Hysis | % Error |
|---|---|---|---|
| 27.5 wt % SS Feed (g/hr) | 950 | 950 | n/a |
| ABC Feed (g/hr) | 530 | 530 | n/a |
| Glauber's Salt Feed (g/hr) | 290 | 290 | n/a |
| Cryst. Temp © | 40 | 40 | n/a |
| Centrate Ph | 8.65 | 7.85 | 10.2 |
| Centrate Product (Note 1) (g/hr) | 1430 | 1445 | −1.0 |
| SBC Product (g/hr) | 270 | 275 | −1.8 |

Example 2

Illustration of the Impact of Lower Sodium Sulfate Concentration in the Feed on Once Through Conversion to Sodium Bicarbonbate in Sodium Bicarbonate Precipitation Step This example illustrates the negative impact of too much water in the sodium sulfate feed solution on the once through conversion to sodium bicarbonate in the sodium bicarbonate precipitation step. The calculations were done utilizing the process simulator Hysis™ coupled with OLI's™ property package.

Take as an example, the feed shown in Table 3 below which is derived from sodium bicarbonate scrubbing of flue gas generated by burning coal.

This feed has a water concentration of 78.1 wt % and when it is mixed with 112.2 kg of anhydrous ammonium bicarbonate (ammonium to sodium molar ratio of 1.10) and the temperature is adjusted to 38° C., 47.0 kg of sodium bicarbonate precipitate is produced. The once through conversions of the sodium and bicarbonate to sodium bicarbonate are 19.6% and 39.4% respectively.

TABLE 3

EXAMPLE FEED SOLUTION COMPOSITION

| Component Flows | | |
|---|---|---|
| Water - $H_2O$ | kg | 717.0 |
| Carbon Dioxide - $CO_2$ | kg | 0.0 |
| Ammonia - $NH_3$ | kg | 0.0 |
| Sodium Ion - Na | kg | 65.5 |
| Ammonium Ion - $NH_4$ | kg | 0.0 |
| Carbonate Ion - $CO_3$ | kg | 4.3 |
| Bicarbonate Ion - $HCO_3$ | kg | 3.8 |
| Sulphate Ion - $SO_4$ | kg | 119.0 |
| Nitrate Ion - $NO_3$ | kg | 5.6 |
| Fluoride Ion - F | kg | 0.2 |
| Chloride Ion - Cl | kg | 2.5 |
| Hydrogen Ion - H | kg | 0.0 |
| Hydroxide Ion - OH | kg | 0.0 |
| Total | kg | 917.7 |
| Component Wt % | | |
| Water - $H_2O$ | | 78.1 |
| Carbon Dioxide - $CO_2$ | | 0.0 |
| Ammonia - $NH_3$ | | 0.0 |
| Sodium Ion - Na | | 7.1 |
| Ammonium Ion - $NH_4$ | | 0.0 |
| Carbonate Ion - $CO_3$ | | 0.5 |
| Bicarbonate Ion - $HCO_3$ | | 0.4 |
| Sulphate Ion - $SO_4$ | | 13.0 |
| Nitrate Ion - $NO_3$ | | 0.6 |
| Fluoride Ion - F | | 0.0 |
| Chloride Ion - Cl | | 0.3 |
| Hydrogen Ion - H | | 0.0 |
| Hydroxide Ion - OH | | 0.0 |
| Total | | 100.0 |

Removing 179.7 kg of water from this stream drops the water concentration to 72.8 wt % and when this concentrated stream is mixed with 112.2 kg of anhydrous ammonium bicarbonate and the temperature is adjusted to 38° C., the "once through" production of sodium bicarbonate increases from 47 kg to 69.3 kg. The "once through" conversions of the sodium and bicarbonate to sodium bicarbonate increase from 19.6% to 29.0% and from 39.4% to 58.1% respectively.

Therefore, reducing the amount of water in the sodium sulfate feed solution significantly increases the conversion of sodium and bicarbonate to sodium bicarbonate. It also significantly improves the overall process efficiency since the size of the recycle streams is inversely proportional to the sodium conversion efficiency.

Example 3

Impact of Water Concentration on Salt Produced in Combined Salt Precipitation Step This example illustrates the negative impact of incorrect water concentration in the combined salt precipitation step.

Figure 6:
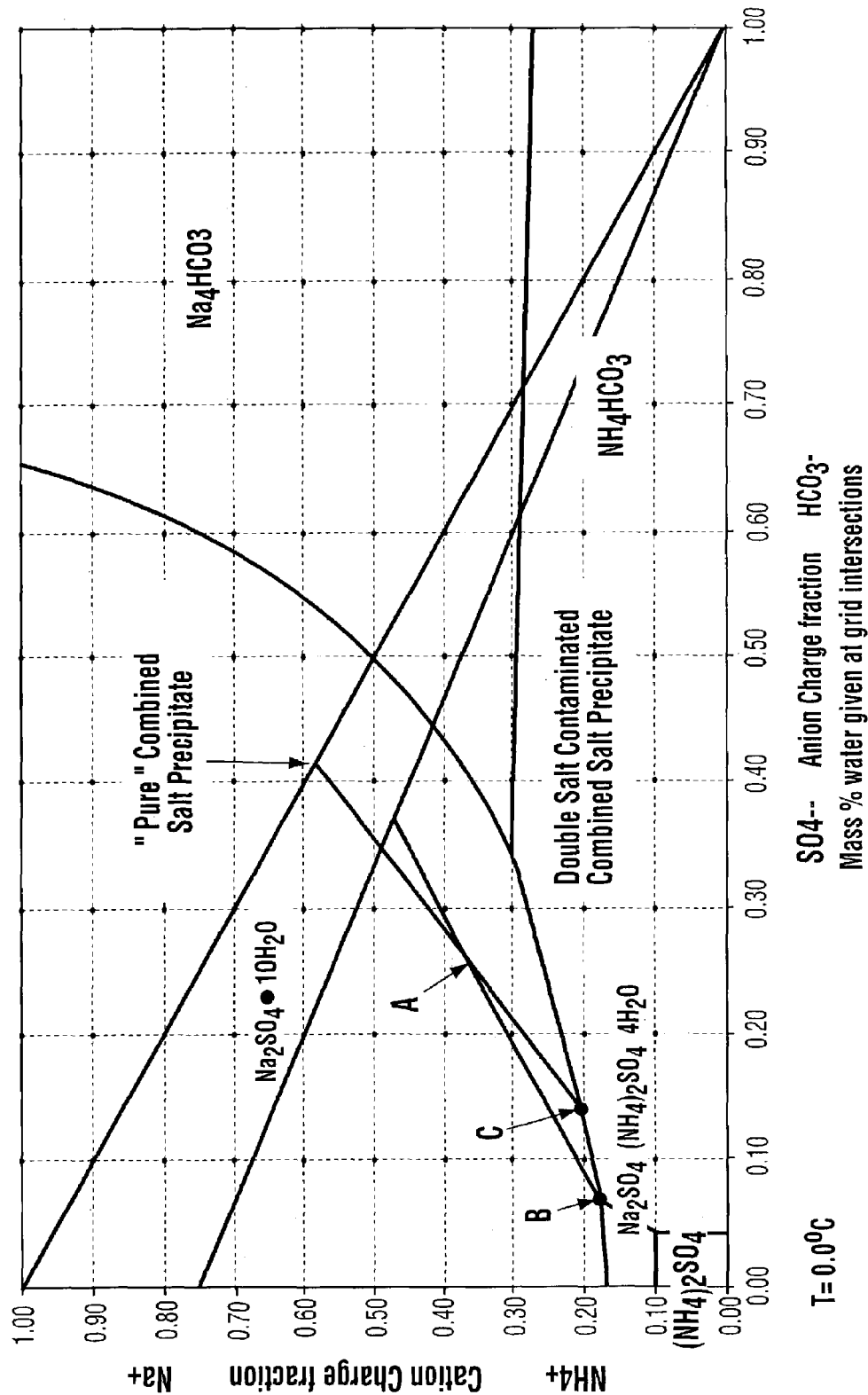
FIG. 6 is a Janecke diagram that represents the chemical equilibrium involved in the combined salt precipitation step.

FIG. 6 shows the Janecke diagram that represents the phase equilibrium in the combined salt precipitation step at a temperature of 0° C. If point A represents the charge fraction plot of the feed, it will be obvious to one skilled in the art that it is very important to ensure that the water concentration in the feed is adjusted such that the final mother liquor "stops" before the Glauber's salt/ammonium bicarbonate/double salt invariant point (point B) is reached ie. at point C. Otherwise, double salt will form in addition to combined salt on a once through basis. This means that products (ammonium sulfate) begin to recycle back to the sodium bicarbonate precipitation step, reducing the overall efficiency of the process. This contamination will get worse as the process reaches a new equilibrium deteriorating the commercial viability of the process.

The following calculations done utilizing the process simulator Hysis™ with the OLI™ property package emphasize this point. Take as an example, aA combined salt precipitation step feed with the composition shown in Table 4 below is exemplified.

TABLE 4

EXAMPLE COMBINED SALT PRECIPITATION STEP FEED

| Component Flow | | |
|---|---|---|
| Water - $H_2O$ | kg | 695.8 |
| Carbon Dioxide - $CO_2$ | kg | 0.3 |
| Ammonia - $NH_3$ | kg | 1.1 |
| Sodium Ion - Na | kg | 38.3 |
| Ammonium Ion - $NH_4$ | kg | 94.6 |
| Carbonate Ion - $CO_3$ | kg | 20.7 |
| Bicarbonate Ion - $HCO_3$ | kg | 117.5 |
| Sulphate Ion - $SO_4$ | kg | 198.0 |
| Nitrate Ion - $NO_3$ | kg | 5.8 |
| Fluoride Ion - F | kg | 0.2 |
| Chloride Ion - Cl | kg | 2.6 |
| Hydrogen Ion - H | kg | 0.0 |
| Hydroxide Ion - OH | kg | 0.0 |
| Total | kg | 1174.7 |
| Component Wt % | | |
| Water - $H_2O$ | | 59.2 |
| Carbon Dioxide - $CO_2$ | | 0.0 |
| Ammonia - $NH_3$ | | 0.1 |
| Sodium Ion - Na | | 3.3 |
| Ammonium Ion - $NH_4$ | | 8.1 |
| Carbonate Ion - $CO_3$ | | 1.8 |
| Bicarbonate Ion - $HCO_3$ | | 10.0 |
| Sulphate Ion - $SO_4$ | | 16.9 |
| Nitrate Ion - $NO_3$ | | 0.5 |
| Fluoride Ion - F | | 0.0 |
| Chloride Ion - Cl | | 0.2 |
| Hydrogen Ion - H | | 0.0 |
| Hydroxide Ion - OH | | 0.0 |
| Total | | 100.0 |

To this feed, 191.3 kg of double salt recycled from the downstream double salt precipitation step is added. If 161.0 kg of water is also added and the mixture chilled to 0° C., the resultant salt precipitated will contain 100 kg of ammonium bicarbonate, 217 kg of Glauber's salt and no double salt. If the 161.0 kg of water is not added, the resultant salt precipitated will contain 111.6 kg of ammonium bicarbonate, 198.4 kg of Glauber's salt and 42 kg of double salt. Not only has this increased the mass flow of the combined salt recycle by 10% (on a once through basis), but there is also a product being recycled (ammonium sulfate) back to the sodium bicarbonate precipitation step. If this double salt contamination is allowed to continue (by not properly adjusting the water content), the efficiency of the process deteriorates.

Carbon dioxide from the sodium bicarbonate crystallizer and possibly the bicarbonate removal step or external sources is also added to the combined salt precipitation step to push the anion charge fraction to the right. This helps, in conjunction with proper water adjustment, to keep a double salt from forming.

Example 4

Illustration of Chemical Equilibrium Involved in the Production of Pure Ammonium Sulfate From a Mixed Solution of Sodium Sulfate and Ammonium Sulfate FIG. 7 shows the T-x (temperature-composition) diagram that applies to the chemical equilibrium involved in the production of high quality ammonium sulfate from solutions containing sodium sulfate and ammonium sulfate.

An analysis of FIG. 7 reveals that a very slight change in the cation charge fraction (Y axis) of the solution can shift it from the ammonium sulfate saturation plane to the sodium sulfate or double salt saturation planes. If this happens, it is not possible to produce high quality ammonium sulfate. The prior art was deficient in demonstrating the understanding of this system as shown in FIG. 7. This deficiency made it very difficult to manipulate the process variables to produce a solution with a cation charge fraction that falls in the ammonium sulfate saturation plane.

As another example, the solution with the composition as shown in Table 5 was studied.

TABLE 5

EXAMPLE AMMONIUM SULFATE/SODIUM SULFATE SOLUTION

Component Flow

| | | |
|---|---|---|
| Water - $H_2O$ | Kg | 1127.8 |
| Carbon Dioxide - $CO_2$ | Kg | 0.0 |
| Ammonia - $NH_3$ | Kg | 2.3 |
| Sodium Ion - Na | Kg | 37.0 |
| Ammonium Ion - $NH_4$ | Kg | 190.7 |
| Carbonate Ion - $CO_3$ | Kg | 0.0 |
| Bicarbonate Ion - $HCO_3$ | Kg | 0.0 |
| Sulphate Ion - $SO_4$ | Kg | 450.1 |
| Nitrate Ion - $NO_3$ | Kg | 108.8 |
| Fluoride Ion - F | Kg | 2.5 |
| Chloride Ion - Cl | Kg | 32.9 |
| Hydrogen Ion - H | Kg | 0.0 |
| Hydroxide Ion - OH | Kg | 0.0 |
| Total | Kg | 1952.0 |

Component Wt %

| | |
|---|---|
| Water - $H_2O$ | 57.8 |
| Carbon Dioxide - $CO_2$ | 0.0 |
| Ammonia - $NH_3$ | 0.1 |
| Sodium Ion - Na | 1.9 |
| Ammonium Ion - $NH_4$ | 9.8 |
| Carbonate Ion - $CO_3$ | 0.0 |
| Bicarbonate Ion - $HCO_3$ | 0.0 |
| Sulphate Ion - $SO_4$ | 23.1 |
| Nitrate Ion - $NO_3$ | 5.6 |
| Fluoride Ion - F | 0.1 |
| Chloride Ion - Cl | 1.7 |
| Hydrogen Ion - H | 0.0 |
| Hydroxide Ion - OH | 0.0 |
| Total | 100.0 |

The cation charge fraction (Y axis in FIG. 6) is calculated as follows:

cation charge fraction=1.609/(1.609+10.594)=0.13

Referring to FIG. 6, with a cation charge fraction of 0.13, the solution falls on the ammonium sulfate saturation plane providing the temperature and water content are also adjusted correctly. By adjusting the feed solution such that it falls on the ammonium sulfate saturation plane, it is possible to produce high purity ammonium sulfate with the correct amount of water removal or cooling. If the above solution contained 125 kg of sodium instead of 37 kg, the moles of sodium would be 5.435 kgmoles and the cation charge fraction would be 0.34. At this cation charge fraction, it would be impossible to produce pure ammonium sulfate. Assuming that the temperature and water content were such that the solution falls onto the sodium sulfate saturation plane just above the sodium sulfate/ammonium sulfate co precipitation line, only sodium sulfate would be produced until this line is hit, at which point a mixture of ammonium sulfate and sodium sulfate would be produced (if water were removed from the system). If instead of removing water the solution is cooled, sodium sulfate would precipitate until the sodium sulfate/double salt saturation line is reached at which point sodium sulfate and double salt would co-precipitate. There would be no ammonium sulfate production at all.

The present invention elegantly ensures that the solution from which pure ammonium sulfate is precipitated falls within the ammonium sulfate saturation plane. This is accomplished by the unique configuration of the combined salt precipitation step followed by the double salt precipitation steps which control the amount of sodium in the solution.

Although specific embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method for recovering purified sodium bicarbonate and ammonium sulfate from an inlet solution, containing sodium sulfate, comprising the steps of:
   A) providing an inlet solution containing sodium sulfate;
   B) converting in a conversion step, the inlet solution to form a sodium bicarbonate precipitate said conversion step including
      i) adding combined salt containing ammonium bicarbonate and Glauber's salt to the inlet solution;
      ii) adding at least one of (a) carbon dioxide and ammonia gas or (b) ammonium bicarbonate to the said inlet solution;
      iii) maintaining an ammonium to sodium ratio of not less than 1;
      iv) removing said sodium bicarbonate precipitate out of solution from step (iii);
   C) mixing said solution from step B) (iv) with an ammonium sulfate/sodium sulfate double salt;
   D) cooling said mixture from step C) to form a combined salt;
   E) precipitating said combined salt and removing said combined salt out of solution from step D);
   F) removing residual bicarbonate from said solution from step E);
   G) mixing said solution from step F with a mother liquor prepared from steps A) to G) and further cooled to precipitate out and remove therefrom a double salt and from which ammonium sulfate has been concentrated and removed;
   H) cooling the mixture from step G) to precipitate double salt;
   I) separating precipitated double salt from the said solution from step H) and recycling to step C; and
   J) recovering ammonium sulfate by concentrating the solution of step I).

2. The method as set forth in claim 1, wherein said inlet solution of sodium sulfate is derived from a sodium bicarbonate flue gas scrubbing operation.

3. The method as set forth in claim 2, wherein said inlet solution of sodium sulfate contains contaminants selected from the group consisting of sodium carbonate, sodium sulfite, sodium nitrate, sodium nitrite, sodium chloride and sodium fluoride.

4. The method as set forth in claim 3, wherein said contaminants are purged from the process by removing a mother liquor slipstream remaining after recovering the ammonium sulfate in step J).

5. The method as set forth in claim, 1, wherein said inlet solution is concentrated by removal of water such that the said inlet solution contains not less than 25 wt % sodium salts.

6. The method as set forth in claim 1, wherein said ammonium to sodium ratio is maintained in the optimal range of between 1.00 and 1.10.

7. The method as set forth in claim 1, wherein said ammonium to sodium ratio is maintained by the addition of ammonia gas and carbon dioxide gas or ammonium bicarbonate.

8. The method as set forth in claim 1, wherein a temperature in the sodium bicarbonate precipitation step is maintained in the an optimal range of between 35° C. and 40° C.

9. The method as set forth in claim 1, wherein said residual bicarbonate is removed from said solution of step E) by temperature stripping.

10. The method as set forth in claim 9, wherein resultant carbon dioxide, ammonia and water is recycled to step B).

11. The method as set forth in claim 9, wherein resultant carbon dioxide, ammonia and water is recycled to step C).

12. The method as set forth in claim 9, wherein an overhead temperature in said temperature stripping operation is maintained optimally between 65° C. and 70° C.

13. The method as set forth in claim 1, wherein said residual bicarbonate is removed from said solution from step E) by acidification.

14. The method as set forth in claim 13, wherein resultant carbon dioxide is recycled to step B).

15. The method as set forth in claim 13, wherein resultant carbon dioxide is recycled to step C).

16. The method as set forth in claim 1, wherein said step of concentrating (step J) comprises evaporating water from said solution from step I).

17. The method as set forth in claim 16, further including after step J) the step of separating concentrated ammonium sulfate and residual solution.

18. The method as set forth in claim 1, further including the step of adding water in step C).

19. The method as set forth in claim 1, further including the step of adding carbon dioxide in step C).

20. The method as set forth in claim 1, further including the step of recycling combined salt formed in step E) to step B).

21. The method as set forth in claim 1 wherein carbon dioxide formed in step B) is introduced at step C).

22. The method as set forth in claim 1, wherein the temperatures in steps D) and H) are maintained optimally between −2° and 20° C.

23. The method as set forth in claim 1, wherein residual bicarbonate is removed from the solution from step I).

24. The method as set forth in claim 1, wherein residual bicarbonate is removed in step J).

25. The method as set forth in claim 1, wherein solution from step F) is processed into alternate fertilizers.

* * * * *